A. Holdredge.
Curing Cheese.
Nº 98,262.   Patented Dec. 28, 1869.
Fig: 1.
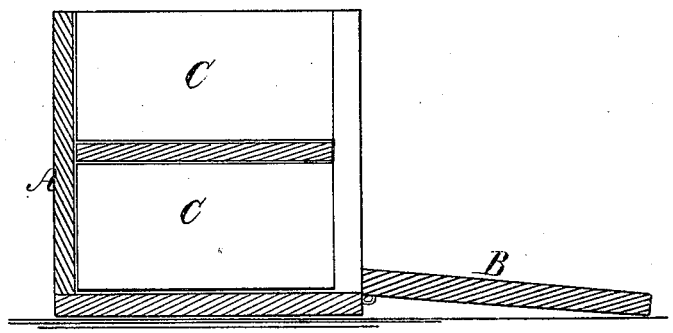
Fig: 2.
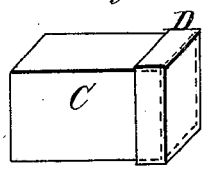
Witnesses;
Alex F Roberts
Wm A Morgan
Inventor;
A. Holdredge
pr Munn &Co

United States Patent Office.

ARTEMAS HOLDREDGE, OF WEST BURLINGTON, NEW YORK.

Letters Patent No. 98,262, dated December 28, 1869.

IMPROVEMENT IN CURING CHEESE.

The Schedule referred to in these Letters Patent and making part of the same.

*To all whom it may concern:*

Be it known that I, ARTEMAS HOLDREDGE, of West Burlington, in the county of Otsego, and State of New York, have invented a new and improved Mode of Curing Cheese, and preserving the same when cutting; and I do hereby declare that the following is a full, clear, and exact description thereof, which will enable others skilled in the art to make and use the same, reference being had to the accompanying drawings, forming part of this specification.

This invention relates to improvements in making cheese, and consists in a series of steps, or distinct operations, by which a very superior article is produced, and its keeping-qualities greatly augmented.

Figure 1 represents a sectional elevation of a cheese-hoop or mould, showing my improvement in pressing it.

Figure 2 represents a perspective view of a cheese, made according to my improvement, and shaped as I propose to make them.

Figure 3 represents a perspective view of a cheese, cut, and partly used.

Similar letters of reference indicate corresponding parts.

The cheese, as now made, is pressed into flat, round blocks or cakes, and placed, after pressing, upon shelves, to permit the whey, which fails of being expressed by the pressing, to escape by evaporation.

The material part of this whey, left after pressing, is at or about the center of the mass, but tends, when the cheese is at rest, to percolate toward the bottom. It is necessary to turn these cakes frequently, from side to side, to expose the surface equally to the atmosphere, and for other reasons. Owing to the form of the cakes, they can only be turned from side to side. This counteracts the movement of the whey, and much of it is kept in the cheese, which would otherwise escape.

The round form of these cakes is objectionable, in packing for shipment, storage, and for cutting up by the retailer or consumer, as is well known.

When the curd is ready for pressing, it is placed in a hoop or mould, A, of rectangular form and with one side, B, arranged to swing open on hinges, for the removal of the cakes, after they are pressed.

I then press the said curd, in any suitable way, into a broad, flat cake.

This I cut, vertically, into two or more blocks, C, and bandage them with muslin.

These I place, one upon another, in layers, say two deep, in the said mould, with thin boards, or other plates, between, and again subject them to the action of the press, by which the whey is still further pressed out, especially at the freshly-cut sides of the cakes.

After pressing a sufficient length of time, I turn the cakes a quarter of a revolution, and subject the other sides to the press, in the same manner.

This I continue as long as needed, after which I remove the cakes, and place them on the shelves, to allow the remaining whey to escape by evaporation; and this I find to be greatly facilitated by the form of these cakes, in the respect, that as the whey percolates toward the bottom of the cake, and that in turning, as is required, from time to time, the cakes are only turned a quarter of a revolution, the whey, instead of being turned directly back in its course, is turned at right angles thereto, and is, consequently, always tending nearer to the exteriors.

In this way, together with my improved mode of pressing, the whey is so far dissipated that decomposition is much less liable to take place, and I am, therefore, enabled to preserve my cheese, without the greasing-process commonly employed.

Having thus described my invention,

What I claim as new, and desire to secure by Letters Patent, is—

The above-described process of curing cheese, by cutting the flat cakes into blocks, of rectangular form, covering the said blocks with some fabric, and placing them, two deep, in a mould, with flat plates between them, then subjecting them to pressure, as set forth, the said blocks being afterward turned on shelves, in the manner described.

The above specification of my invention signed by me, this 27th day of May, 1869.

A. HOLDREDGE.

Witnesses:
FRANK BLOCKLEY,
ALEX. F. ROBERTS.